United States Patent [19]

Schmidt et al.

[11] Patent Number: 5,552,460
[45] Date of Patent: Sep. 3, 1996

[54] PROCESS FOR PRODUCING COMPOSITE ARTICLES MADE OF POLYESTERS AND ELASTOMERS

[75] Inventors: Friedrich G. Schmidt; Horst Heuer, both of Haltern, Germany

[73] Assignee: Huels Aktiengesellschaft, Marl, Germany

[21] Appl. No.: 413,821

[22] Filed: Mar. 30, 1995

[30] Foreign Application Priority Data

Apr. 30, 1994 [DE] Germany .......................... 44 15 302.3

[51] Int. Cl.⁶ ....................................... C08K 5/29
[52] U.S. Cl. ........................ 523/522; 523/523; 524/505; 524/513; 525/171
[58] Field of Search ................... 524/505, 513; 523/522, 523; 525/171

[56] References Cited

U.S. PATENT DOCUMENTS

| | | | |
|---|---|---|---|
| 3,972,973 | 8/1976 | Yardley et al. | 264/265 |
| 4,897,446 | 1/1990 | Aonuma | 525/6055515936 |
| 5,102,489 | 4/1992 | Grosse-Puppendahl | 156/307.1 |

FOREIGN PATENT DOCUMENTS

| | | |
|---|---|---|
| 0142930 | 5/1985 | European Pat. Off. . |
| 0230344 | 7/1987 | European Pat. Off. . |
| 0375867 | 7/1990 | European Pat. Off. . |

OTHER PUBLICATIONS

Patent Abstracts of Japan, vol. 18, No. 268 (C–1202), May 23, 1994, and Derwent Abstract AN–94–089463, JP–A–6 041405, Feb. 15, 1994.

*Primary Examiner*—Edward J. Cain
*Attorney, Agent, or Firm*—Oblon, Spivak, McClelland, Maier & Neustadt, P.C.

[57] ABSTRACT

Process for producing composite articles made of polyesters and elastomers. Composite articles made of a thermoplastic polyester and a vulcanizate are to be produced. These articles are obtained by producing the vulcanizate under conventional vulcanization conditions in contact with the hard component by vulcanization of a rubber composition which contains the following components:

I. 100 parts by weight of a rubber,

II. From 0 to 300 parts by weight of fillers,

III. From 1 to 10 parts by weight of peroxidic vulcanization agents,

IV. From 0 to 4 parts by weight of vulcanization activators and

V. From 0 to 150 parts by weight of plasticizers, where a) the hard and/or the soft component, as desired, additionally contains from 0.5 to 12 parts by weight of a difunctional or polyfunctional maleimide and b) in the case of the hard component containing no difunctional or polyfunctional maleimide, the rubber possesses carboxyl or acid anhydride groups.

A strong composite is obtained by this process.

16 Claims, No Drawings

PROCESS FOR PRODUCING COMPOSITE ARTICLES MADE OF POLYESTERS AND ELASTOMERS

BACKGROUND OF THE INVENTION

1. Field of the Invention

The present invention relates to a process for producing composite articles made of at least one hard and at least one soft component, with the hard component being based on a thermoplastic polyester and the soft component being a vulcanizate. The invention further relates to the articles obtained by this process.

2. Discussion of the Background

Frequently a single material cannot contribute all the properties which are demanded by an article. Such incompatible property combinations are, for example, simultaneously high strength and rubber elasticity or high hardness and stiffness on the one hand and skid resistance on the other hand.

To equip components with properties which cannot be contributed by a single material, they are composed of parts of various materials. A necessary prerequisite for the functionality of such articles is frequently strong adhesion between the parts of various materials.

The technical objective of generally bonding rubbers and thermoplastics strongly to one another is conventionally known and has hitherto been achieved in various, but not totally satisfactory ways.

Composite materials made of thermoplastically stiff and rubber-elastic molding materials are customarily put together by adhesive bonding, screwing, rivetting, mechanical interlocking or with the use of a coupling agent. Recently, interesting processes have been developed for producing a composite comprising molding compositions based on polyphenylene ethers (PPE) and certain rubbers which can be vulcanized by sulphur or peroxide (cf. EP-A-0 196 407 and EP-A-0 315 749).

The bond strength values achieved here are considerable.

It would be desirable, however, to also produce composite materials whose thermoplastic component, besides having a high geometric stability on heating, simultaneously has a good solvent resistance, stability to weathering and excellent sliding friction behavior.

Although it is known that the processes known from the cited applications are linked to certain unique and critical parameters, consideration could in principle be given to replacing the polyphenylene ether by other thermoplastics which better fulfil the specified requirements. However, it has been found that, for example, polyesters which are known to fulfil the above-mentioned requirements, do not allow satisfactory adhesion values to be achieved under the process conditions considered essential (see comparative experiments). It therefore appeared to be not possible to produce composites comprising thermoplastic polyesters and rubbers.

EP-A-0 375 867 describes a process for producing such composites in which the thermoplastic component comprises at least 30% of a reaction product of a thermoplastic polyester and a polyisocyanate. These reaction products have the disadvantage that at sufficiently high concentration of polyisocyanate they can only be injection-molded or extruded within a very narrow processing window.

German Application P 43 31 995.5 describes a process in which polyesters having an unimpaired processing behavior can be used in a composite with rubbers. This comprises using a hard component based on a thermoplastic polyester containing aliphatic double bonds, and, for the soft component, starting out from a rubber composition which is vulcanized in contact with the hard component under conventional vulcanization conditions and contains a particular functional silane.

However, improvements in the polyester processing behavior is being pursued.

SUMMARY OF THE INVENTION

Accordingly, one object of the present invention is to provide polyesters having an unimpaired processing behavior, which can be used in a composite with rubbers. This comprises using a hard component based on a thermoplastic polyester and, for the soft component, starting out from a rubber composition which is vulcanized in contact with the hard component under conventional vulcanization conditions and contains the following components:

I. 100 parts by weight of a rubber,
II. 0 to 300 parts by weight of a filler,
III. 1 to 10 parts by weight of a peroxidic vulcanization agent,
IV. 0 to 4 parts by weight of a vulcanization activator; and
V. 0 to 150 parts by weight of a plasticizer,
wherein
a) either said hard component, said soft component or both further comprises from 0.5 to 12 parts by weight of a difunctional or polyfunctional maleimide of the formula

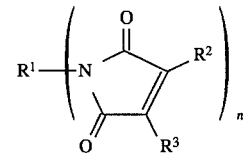

where $R^1$ can be any divalent or higher-valent radical or a direct bond, while $R^2$ and $R^3$ can be, independently of one another, hydrogen, $C_{1-20}$ alkyl, $C_{3-20}$ cycloalkyl or $C_{6-20}$ aryl; n is an integer greater than or equal to 2, preferably from 2 to 4, and b) in the case of said hard component containing no difunctional or polyfunctional maleimide, the rubber possesses carboxyl or acid anhydride groups.

The bonding mechanism between polyester and vulcanizate which is effective here is not yet known for certain.

DETAILED DESCRIPTION OF THE PREFERRED EMBODIMENTS

The individual constituents of the hard and the soft components will be described in more detail below.

The hard component based on a polyester can be a polyester, a polyester molding composition, a polyester blend or a fiber composite material having a polyester matrix.

The thermoplastic polyester can be prepared in a conventional manner, known to those of ordinary skill in the art, such as by transesterification or esterification of aromatic dicarboxylic acids having from 8 to 14 carbon atoms or their esters with suitable diols and subsequent polycondensation (cf. "Polymer Chemistry", Interscience Publ., New York, 1961, pp. 111–127; Kunststoffhandbuch, Volume VIII, C.

Hanser Verlag, Munich, 1973 and Journal of Polymer Science, Part Al, 4, pp. 1851–1859 (1966)).

Suitable aromatic dicarboxylic acids are, for example, phthalic acid, isophthalic and terephthalic acid or esters thereof. The aromatic dicarboxylic acids can be partly replaced by aliphatic and/or cycloaliphatic dicarboxylic acids having up to 12 carbon atoms. Examples which may be mentioned are cyclohexane-1,4-dicarboxylic acid, adipic acid, sebacic acid, azelaic acid and decanedicarboxylic acid as saturated dicarboxylic acids and also maleic acid, fumaric acid, aconitic acid, itaconic acid, tetrahydrophthalic acid, tetrahydroisophthalic acid and tetrahydroterephthalic acid as unsaturated dicarboxylic acids.

Suitable diol components are, for example, diols of the general formula $HO-(CH_2)_n-OH$ having n=2 to 12, such as ethylene glycol, propane-1,3-diol, butane-1,4-diol and hexane-1,6-diol, neopentyl glycol, 1,4-di(hydroxymethyl)cyclohexane, and unsaturated diols such as butene-1,4-diol.

A part of these diols can be replaced by a poly(oxyalkylene)diol having a molecular weight (Mn) of up to 3,000, such as poly(oxyethylene)diol or poly(oxytetramethylene)diol, or by branched alkylenediols such as 2-methyl-1,4-butanediol.

The polyesters used according to the invention appropriately have a viscosity number J, measured in accordance with DIN 53 728 at 25° C. on a solution in phenol/1,2-dichlorobenzene (50:50, w/w) at a concentration of 5 g/l, in the range from 80 to 240 cm$^3$/g.

In a preferred embodiment, the dicarboxylic acid component of this polyester is based on terephthalic acid.

Poly(ethylene terephthalate) and poly(butylene terephthalate) are particularly preferably used as polyester. The action of the difunctional or polyfunctional maleimide can be further increased, to a certain extent, if the polyester contains aliphatic double bonds. Thus, in a further particularly preferred embodiment, use is made of polyesters having a dicarboxylic acid component based on terephthalic acid and a diol component which comprises from 0 to 99.9 mol % of butane-1,4-diol and from 0.1 to 100 mol % of butene-1,4-diol. In a prefered embodiment the diol component comprises from 50 to 99 mol % of butane-1,4-diol and from 1 to 50 mol % of butene-1,4-diol.

The double bond content which may be desired of the polyester can of course be set by using a mixture of a polyester containing double bonds and, for example, a polyester free of double bonds.

For the purposes of this invention, a polyester molding composition is a polyester preparation corresponding to the prior art which have been used for improving the processing properties or for modifying the use properties. Polyester molding compositions contain, for example, stabilizers, lubricants, fillers such as carbon black, graphite, metal flakes, titanium dioxide and zinc sulphide, reinforcers such as glass, carbon, aramid or metal fibers, plasticizers, dyes and/or flame retardants. The proportion of the reinforcers in the molding compositions can be up to 50% by weight, that of the flame retardants up to 20% by weight and that of all other additives up to a total of 10%, in each case based on the total molding composition.

For the purposes of this invention, polyester blends are molding compositions which are composed of polyesters and other polymers and also the additives customary in polyester molding compositions. The polymer constituents can be soluble in one another or one polymer constituent can be dispersed in the other, or both can form inter-penetrating networks with one another.

For the purposes of the present invention, any known polyester blend can in principle be used. Examples of which mention may be made are: PBT/PC or PET/PC blends, impact-modified polyesters which contain as impact modifier, for instance, MSA or glycidyl methacrylate-modified rubbers, polyester/polyamide blends, blends of polyesters and polyolefins and also blends of polyesters and PMMA, PMMI, ABS, epoxy resins or block copolyether ester elastomers. Such systems are described, for example, in the following publications: Polymer Blends, Ed.: E. Martuscelli, R. Palumbo and M. Kryszewski, Plenum Press, New York, 1980; Polymer Alloys, Ed.: D. Klempner and K. C. Frisch, Plenum Press, New York, 1983; WO-A-87/00850; EP-A- 0 037 547; EP-A-0 276 327 and H. Saechtling, Kunststoff-Taschenbuch, 25th edition, C. Hanser Verlag, Munich, Vienna, 1992.

The polyester content of the polyester blend should be at least 30% by weight, based on the sum of all polymer components.

For the purposes of the present invention fiber composite materials having a polyester matrix are materials which are composed of, on the one hand, uncut reinforcing fibers or fabrics thereof and, on the other hand, a matrix of polyesters, polyester molding compositions or polyester blends.

Fiber composite materials having a matrix of polyesters, polyester molding compositions or polyester blends can be produced in various ways; for example, reinforcing fibers or reinforcing fabrics impregnated with polyesters, so called prepregs, can be consolidated by means of pressure and temperature to give sheets of laminate. It is also possible to process hybrid yarns of polyester fibers and reinforcing fibers, or films of the specified thermoplastics and fabrics of reinforcing fibers under pressure and temperature to give composite materials. Suitable reinforcing fibers are, for example, glass fibers, carbon fibers and aramid fibers.

The rubber composition used in the process of the invention contains, under the specified circumstances, a rubber containing carboxyl or anhydride groups which is prepared, for example, in a known manner by carboxylation with unsaturated acids or acid derivatives such as maleic acid or maleic anhydride (cf. for example U.S. Pat. No. 4,010,223). It is also possible to prepare these rubbers by copolymerization with unsaturated acids such as acrylic acid. Suitable rubbers are, in principle, all those containing carboxyl or anhydride groups which can be prepared in a known manner.

A general lower limit for the carboxyl content or the acid number cannot be given, since this differs according to the type of rubber used and according to the type and amount of the difunctional or polyfunctional maleimide added. The lower limit should therefore be regarded as the value at which the effect of the invention is just established. This value can be determined by a few routine experiments; the Examples 30 to 32 of the invention can here be used as a guide.

The rubber used as the soft component can be, for example, an EP(D)M rubber, an SB rubber (as E-SBR or S-SBR), BR, NR, IR, IIR, CIIR, BIIR, NBR, CR, a styrene-containing block copolymer and/or a polyalkenylene.

EP(D)M rubbers are rubbers which are prepared in a known manner by polymerization of a mixture of ethylene and propylene and, if desired, a diene in the presence of a Ziegler-Natta catalyst.

The EPDM rubber is prepared by polymerization of a mixture of more than 25% by weight of ethylene, more than 25% by weight of propylene and up to 10% by weight, in particular from 1 to 3% by weight, of a preferably unconjugated diene such as bicyclo[2.2.1]heptadiene, 1,4-hexadiene, dicyclopentadiene and, in particular, 5-ethylidenenorbornene.

The SB rubber can be either E-SBR or S-SBR having a styrene content up to a maximum of about 40 percent by weight.

E-SBR is prepared in a known manner by polymerization in emulsion, while S-SBR is prepared by polymerization in solution.

Butadiene rubber (BR) can be prepared in a known manner, for example, by polymerization by means of Li or Co catalysts. The type of linkage here has no detectable influence on the suitability.

Natural rubber (NR) is usually used in the cis-1,4 configuration. However, for the purposes of this invention, the trans-1,4 configuration is also suitable.

Isoprene rubber (IR) can be used regardless of whether it has been prepared, for example, using Ti or Li catalysts. The cis-1,4/trans-1,4 or 1,2 and 3,4 content has no detectable influence on the adhesion properties.

Isobutene-isoprene rubber (IIR) can be used as such or in halogenated form (CIIR or BIIR).

Nitrile rubber (NBR) is obtained by polymerization of butadiene and acrylonitrile in a mass ratio of from about 51:48 to 82:18. Its preparation is virtually exclusively carried out in aqueous emulsion. The resulting emulsions are, for use for the purposes of this invention, worked up to give a solid rubber.

Chloroprene rubber (CR) is usually prepared by free-radical emulsion polymerization. The monomer is incorporated into the polymer in different structural forms. The cis-1,4/trans-1,4 or 1,2 and 3,4 content or the proportion of head/head and head/tail linkage has no detectable influence on the adhesion properties.

Styrene-containing block copolymers which can be used are all known types based on styrene/butadiene or styrene/isoprene. Examples of such copolymers are SB, SBS and SIS and also corresponding types containing a larger number of blocks. The copolymers can be linear or branched. Furthermore, the soft phase can be hydrogenated; corresponding block copolymers are also described as styrene-ethylene-butylene-styrene block copolymers (SEBS).

Polyalkenylenes are prepared by ring-opening or ring-expanding polymerization of cycloalkenes [see K. J. Ivin, T. Saegusa, "Ring-opening Polymerization", Vol 1 Elsevier Appl. Sci. Publishers, London, in particular pages 121 to 183 (1984)]. Of these, preference is given to polyoctenylenes (cf. A. Dräxler, Kautschuk+Gummi, Kunststoff 1981, pages 185 to 190). Polyoctenylenes having different proportions of cis and trans double bonds and also different molecular weights are obtainable by methods known in the literature.

For the purposes of this invention, preference is given to using a rubber which comprises from 30 to 100 parts by weight of an EP(D)M rubber and from 70 to 0 parts by weight of other rubbers.

Suitable carboxylated EPM rubbers are produced, for example, by Exxon Chemical GmbH, Cologne under the name EXXELOR VA 1801, VA 1803 or VA 1806.

A suitable carboxylated EPDM rubber is, for example, maleic anhydride-modified BUNA HÜLS AP from Hüls AG, Marl (experimental product X 4496).

Suitable NBR rubbers provided with carboxyl groups are sold, for example, by Goodyear Tire & Rubber Company, Akron, Ohio, USA, under the name CHEMIGUM® NX 775 and by Zeon Europe GmbH, Dusseldorf, Germany under the names NIPOL 1472 and NIPOL 1072.

The preparation of functionalized rubbers, for example by compounding of the rubber with maleic anhydride at elevated temperature and, if desired, in the presence of free-radical initiators, is conventional in the art.

The functionalized rubbers which can be used according to the invention can also be prepared in situ during vulcanization. For this purpose, a commercial, non-functionalized rubber is used together with a compound which contains at least one C—C double bond and/or C—C triple bond and at least one carboxyl or anhydride group. For example, use can be made of maleic anhydride, monoalkyl maleates, fumaric acid, tetrahydrophthalic hydride, acrylic acid, methacrylic acid, itaconic acid, sorbic acid, oleic acid, linoleic acid, propiolic acid, phenylpropiolic acid, adducts of maleic anhydride with, for example, linoleic acid, adducts of maleic anhydride with a low-molecular-weight polybutadiene or corresponding adducts with a low-molecular-weight polyoctenamer. Any desired rubber can be used here.

A further embodiment comprises using a mixture of a functionalized rubber and a non-functionalized rubber.

Suitable fillers are all materials which are customarily used in rubbers such as, for example, carbon black, silica, silicates, calcium carbonate, zinc oxide and talc. When using highly active fillers, an increased amount of the difunctional or polyfunctional unsaturated compound is needed to achieve adhesion in the composite.

Suitable plasticizers are, in particular, naphthenic and/or aliphatic oils or special plasticizers customary in rubber technology such as, for example, fatty acid esters of polyalcohols or thioethers in an amount of preferably up to 50 parts by weight, based on 100 parts weight of rubber.

Suitable peroxidic vulcanization agents are those peroxides for crosslinking rubbers which are known to those skilled in the art, for example 2,5-dimethyl-2,5-bis(tert-butylperoxy)hexane, dicumyl peroxide, 4,4-di-tert-butylperoxy-n-butyl valerate, 1,1-di-tert-butylperoxy- 3,3,5-trimethylcyclohexane and bis(tert-butylperoxyisopropyl)benzene. Details of the use of peroxidic vulcanizers can be obtained from the company brochure "Rubbery Chemical-Crosslinking-Peroxides" from Akzo-Chemie (Publication date: April 1985).

Suitable vulcanization activators are, for example, triallyl cyanurate (TAC) and acrylates such as ethylene glycol dimethacrylate (EDMA), butanediol dimethacrylate (BDRA) and trimethylolpropane trimethacrylate (TRIM). Preference is given to TAC, BDMA and/or EDMA.

The rubber compositions can also contain further additives such as, for example, vulcanization retarders, aging inhibitors, processing aids, mold release agents and/or blowing agents. In general, these further additives make up at most 50 parts by weight, based on 100 parts by weight of rubber. The preparation of such compounds is described, for example, by F. W. Barrow in "Rubber Compounding", published in 1988 by Marcel Dekker Inc., New York and Basle, or by W. Kleemann in "Mischungen für die Elastverarbeitung", published in 1982 (VEB Deutscher Verlag für Grundstoffindustrie).

The difunctional or polyfunctional maleimide can be, for example, 1,3-phenylenebismaleimide, 1,4-phenylenebismaleimide, 3-methyl-1,4-phenylenebismaleimide, 5-methyl-1,3-phenylenebismaleimide, 4,4'-(N,N'-bismaleimido-)diphenylmethane, 2,4-bismaleimidotoluene, 3,3'-(N,N'-bismaleimido)diphenylmethane, 3,3'-(N,N'-bismaleimido)diphenyl sulphone, 4,4,-(N,N'-bismaleimido)diphenyl sulphone, 1,2-ethylenebismaleimide, 1,3-propylenebismaleimide, 1,4-butylenebismaleimide, 1,10-decenebismaleimide, 1,12-dodecenebismaleimide or the like.

Preference is given to bismaleimides containing an aromatic radical $R^1$; particular preference is given to 1,3-phenylenebismaleimide, 2,4-bismaleimidotoluene or 4,4'-(N,N'-bismaleimido)diphenylmethane.

From 0.5 to 12 parts by weight of these compounds can be used; preference is given to from 1 to 8 parts by weight, particularly preferably from 1.25 to 6 parts by weight, in each case based on 100 parts by weight of rubber or polyester.

The difunctional or polyfunctional maleimide can be incorporated into the thermoplastic component by conventional melt mixing, for example by means of a twin-screw compounder or Buss co-kneader. However, it can also be mixed into the rubber composition in a known manner. In a further possible embodiment, it is incorporated both into the thermoplastic component and into the rubber composition.

The composite comprising the hard component based on polyester and the elastomeric component is produced by vulcanization of the rubber compound while in contact with the hard component.

The articles made of the polyesters, polyester molding compositions or polyester blends on the one hand and rubber compounds on the other hand can be produced in one or two stages. Articles made of fiber composite materials and rubber compounds are produced in two stages.

In the two-stage process, the stiff shaped part is first produced, for example, by injection molding, extrusion or consolidation of prepregs and charged with the rubber compound, pre-shaped if appropriate, and than exposed to the vulcanization conditions of the rubber. The application of the rubber to the stiff shaped part can be carried out by pressing, injection molding or extrusion.

In the two-stage injection molding process, the procedure is similar to that in the two-stage production of two-color injection molded parts. The insert part used is a shaped part of the specified hard materials. Barrel and screws of the injection molding machine are designed in a known manner for rubber processing and the mold can be heated to the vulcanization temperature. If external mold-release agents are used, care has to be taken to ensure that they do not get into the interface of the materials, since they can impair adhesion in the composite.

In the application and vulcanization by the two-stage extrusion process, for example, a profile produced in the first stage from the thermoplastic, such as a pipe, is enveloped with the rubber composition and is vulcanized with or without application of pressure. Sheets, non-wovens, woven fabrics and ropes are produced in a corresponding manner.

The single-stage injection molding process is carried out in a similar manner to the single stage two-color injection molding process. In this case, one injection molding machine is equipped for thermoplastic processing, the other is equipped for rubber processing. The mold is heated to the prescribed vulcanization temperature which should lie below the solidification temperature of the polyester, the polyester molding composition or the polyester blend.

The optimum vulcanization conditions depend on the rubber mixture selected, in particular on its vulcanization system, and the configuration of the shaped part. The familiar values based on experience can here be used, since the difunctional or polyfunctional maleimide added does not significantly affect the reaction conditions.

Suitable composition temperatures of the rubber mixture in the barrel are generally in the range from 40° to 80° C., preferably from 60° to 70° C.

Suitable vulcanization temperatures depend on the softening temperatures of the insert parts. They are generally in the range from 140° to 200° C. If the softening ranges of the insert parts allow, the temperatures are selected in the upper range, e.g. between 170° and 190° C. The vulcanization times depend not only on the rubber mixture but also on the vulcanization temperatures and the geometry of the parts. They are generally between 30 seconds and 30 minutes; lower temperatures and thicker rubber parts require longer times.

The process of the invention and also the composites produced thereby have the following advantages:

The composite is preferably produced in a few minutes.

The polyesters used in the composite system have a high geometric stability on heating, good solvent resistance, excellent sliding friction behavior and also a water absorption which is only small and can also be used without problems in exterior applications.

The composite is so strong that testing results in a cohesion fracture in the rubber, but not in a separation of the phase interface.

The composites can be used to produce, for example, the following articles: rubber-coated rollers, flanges, pipe and hose couplings, sealing frames, impact-absorbing and radiation-absorbing components, spring elements, vibration dampers, reinforced rubber profiles, conveyor belts, drive belts, pucks for video tape and audio tape equipment, seals, in particular shaft sealing rings, rollers, clutch and brake discs, membranes, pistons having sealing rings, reinforced bellows, pump housings and flaps, polyester-reinforced rubber hoses, etc.

Having generally described this invention, a further understanding can be obtained by reference to certain specific examples which are provided herein for purposes of illustration only and are not intended to be limiting unless otherwise specified.

EXAMPLES

The following materials were used for the preparation of the rubber mixture:

EXXELOR VA 1803, an MSA-(1%)-modified EPM rubber from Exxon Chemical, Cologne, EXXELOR VA 1806 an MSA-(2%)-modified EPM rubber from Exxon Chemical, Cologne. The properties of the products are given in the technical information literature of Exxon Chemical.

BUNA HÜLS AP 341, a random EPDM rubber (Hüls AG, D-45764 Marl) having a Mooney viscosity of ML (1+4) 100° C.=70.

POLYVEST C 70, a low-molecular-weight polymer bearing anhydride groups (MSA-modified oligomeric polybutadiene) which is supplied as polymeric chalk activator for EPDM mixtures. Further information is given in the product information leaflet "POLYVEST C 70" from Hülls AG, D-45764 Marl.

| Durex 0: | Carbon black from Degussa having a CTAB value of 20 $m^2$/g. |
|---|---|
| Omyalite: | Calcium carbonate from Omya, |

9
-continued

| | |
|---|---|
| | Cologne, having a specific surface area of about 7.5 m²/g. |
| Sillitin Z86: | Aluminum silica from Hoffmann Mineral, Neuburg/Donau having a specific surface area of about 14 m²/g. |
| ZnO RS: | Zinc oxide from Carl Arnsberger, Cologne |
| Vulkanox HS: | Polymerized 2,2,4-trimethyl-1,2-di-hydroquinoline from Rhein-Chemie, Rheinau |
| BDMA: | Butanediol dimethacrylate, 75% of calcium silicate from Lehmann & Voss |
| Perkadox 14/40: | Bis-tert-butylperoxy-isopropylbenzene, 40% on chalk and SiO₂ from Akzo Chemicals, Düren |
| Sunpar 2280: | Paraffinic (73%)-naphthenic (23%)-aromatic (4%) oil from Sun Oil, Belgium |
| Ondina Oil G17: | Purely paraffinic, medical white paraffin oil in accordance with German Pharmacopoeia 9 from Deutsche Shell Chemie GmbH, Cologne. |
| Circosol 4240: | Paraffinic-naphthenic oil from Sun Oil, Belgium |
| HVA 2: | m-Phenylenebismaleimide from DuPont, Wilmington, Delaware, USA |
| MDAB: | Bismaleimide from Deutsche Shell Chemie GmbH, Cologne, having the formula |

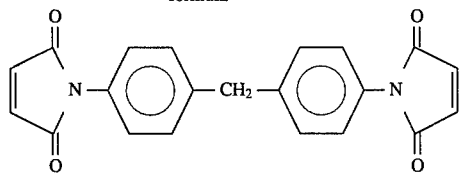

| | |
|---|---|
| TDAB: | Bismaleimide from Deutsche Shell Chemie GmbH, Cologne, having the formula |

The polyester materials used were the following molding compositions:

Type A corresponds to a normal polybutylene terephthalate, VESTODUR 1000 from Hüls AG, D-45764 Marl, having a solution viscosity J of 108 cm³/g.

10

Type B corresponds to polybutylene terephthalate having a copolycondensed content of 1 mol % of 1,4-butene-2-diol having a solution viscosity J of 105 cm³/g.

Type C corresponds to polybutylene terephthalate having a copolycondensed content of 5 mol % of 1,4-butene-2-diol having a solution viscosity J of 106 cm³/g.

Type D corresponds to polybutylene terephthalate having a copolycondensed content of 10 mol % of 1,4-butene-2-diol having a solution viscosity J of 105 cm³/g.

Type E corresponds to polybutylene terephthalate having a copolycondensed content of 20 mol % of 1,4-butene-2-diol having a solution viscosity J of 106 cm³/g.

Type F corresponds to polybutylene terephthalate containing 30% by weight of chopped glass fibers, VESTODUR GF 30 from Hüls AG, Marl, having a solution viscosity of 108 cm³/g.

Type A1 corresponds to a mixture of 100 parts by weight of type A and 1 part by weight of HVA 2, prepared at 250° C. on a twin-screw compounder ZE 25 from Berstorff.

Type A2 is the correspondingly prepared mixture of 100 parts by weight of type A and 3 parts by weight of HVA 2.

Type A3 is the correspondingly prepared mixture of 100 parts by weight of type A and 5 parts by weight of HVA 2.

Type C1 is the correspondingly prepared mixture of 100 parts by weight of type C and 3 parts by weight of HVA 2.

Type D1 is the correspondingly prepared mixture of 100 parts by weight of type D and 3 parts by weight of HVA 2.

Type E1 is the correspondingly prepared mixture of 100 parts by weight of type E and 3 parts by weight of HVA 2.

Type F1 is the correspondingly prepared mixture of 100 parts by weight of type F and 3 parts by weight of HVA 2.

Preparation of the rubber mixtures

The preparation of the individual rubber mixtures I to XXXXVII was carried out in an instrumented laboratory batch compounder (from Haake). 28.57 g of the rubber were first compounded at an initial temperature of 60° C. and a revolution rate of 64 rpm. Over a period of about 5 minutes, the oil given in Table 1, the filler given in Table 1, 1.43 g of ZnO RS and 0.57 g of Vulkanox HS were incorporated and the mixture was homogenized for a further three minutes. During this time, the temperature rose to about 110° C. This premix was subsequently stored at room temperature for ≧24 hours. Subsequently, under the same conditions (60° C. initial temperature, 64 rpm), 1.71 g of Perkadox 14/40, 0.43 g of BDMA and, if applicable, the bismaleimide were incorporated homogeneously over a period of about four minutes. The temperature of the mixture here did not rise above 130° C.

TABLE 1

Composition of the rubber mixtures

| | Rubber type | | | | Filler | | | Oil | | | |
|---|---|---|---|---|---|---|---|---|---|---|---|
| Mixture | BUNA HÜLS AP 341 [G] | Exxelor VA 1806 [g] | Exxelor VA 1803 [g] | Poly-vest C 70 [g] | Sillitin Z86 [g] | Omyalite [g] | Durex O [g] | Ondina G17 [g] | Circosol 4240 [g] | Sunpar 2280 [g] | Bismaleimide Type/[g] |
| I | 28.58 | — | — | — | 22.86 | — | — | — | — | 5.6 | — |
| II | — | — | 28.58 | — | 22.86 | — | — | — | — | 5.6 | — |

TABLE 1-continued

Composition of the rubber mixtures

| Mixture | Rubber type BUNA HÜLS AP 341 [G] | Exxelor VA 1806 [g] | Exxelor VA 1803 [g] | Poly-vest C 70 [g] | Filler Sillitin Z86 [g] | Omyalite [g] | Durex O [g] | Oil Ondina G17 [g] | Circosol 4240 [g] | Sunpar 2280 [g] | Bismaleimide Type/[g] |
|---|---|---|---|---|---|---|---|---|---|---|---|
| III | 28.58 | — | — | — | 22.86 | — | — | — | — | 5.6 | HVA 2/1.4 |
| IV | — | — | 28.58 | — | 22.86 | — | — | — | — | 5.6 | HVA 2/0.28 |
| V | — | — | 28.58 | — | 22.86 | — | — | — | — | 5.6 | HVA 2/0.42 |
| VI | — | — | 28.58 | — | 22.86 | — | — | — | — | 5.6 | HVA 2/0.56 |
| VII | — | — | 28.58 | — | 22.86 | — | — | — | — | 5.6 | HVA 2/0.7 |
| VIII | — | — | 28.58 | — | 22.86 | — | — | — | — | 5.6 | HVA 2/1.4 |
| IX | — | — | 28.58 | — | — | 22.86 | — | — | — | 5.6 | HVA 2/0.42 |
| X | — | — | 28.58 | — | — | 22.86 | — | — | — | 5.6 | HVA 2/0.56 |
| XI | — | — | 28.58 | — | — | 22.86 | — | — | — | 5.6 | HVA 2/0.7 |
| XII | — | — | 28.58 | — | — | 22.86 | — | — | — | 5.6 | HVA 2/1.4 |
| XIII | — | — | 28.58 | — | — | — | 22.86 | — | — | 5.6 | HVA 2/0.7 |
| XIV | — | — | 28.58 | — | — | — | 22.86 | — | — | 5.6 | HVA 2/1.4 |
| XV | — | — | 28.58 | — | 22.86 | — | — | — | — | 11.2 | HVA 2/0.7 |
| XVI | — | — | 28.58 | — | 22.86 | — | — | — | — | 16.8 | HVA 2/0.7 |
| XVII | — | — | 28.58 | — | 22.86 | — | — | — | — | 5.6 | HVA 2/0.7 |
| XVIII | — | — | 28.58 | — | 22.86 | — | — | — | — | 11.2 | HVA 2/0.7 |
| XIX | 14.29 | 14.29 | — | — | 22.86 | — | — | — | — | 5.6 | HVA 2/0.7 |
| XX | 14.29 | 9 14.29 | — | — | 22.86 | — | — | — | — | 5.6 | HVA 2/0.7 |
| XXI | — | — | 28.58 | — | 22.86 | — | — | — | 5.6 | — | HVA 2/0.7 |
| XXII | — | — | 28.58 | — | 22.86 | — | — | — | 5.6 | — | HVA 2/1.4 |
| XXIII | — | — | 28.58 | — | 22.86 | — | — | 5.6 | — | — | HVA 2/0.7 |
| XXIV | — | — | 28.58 | — | 22.86 | — | — | — | — | 5.71 | TDAB/0.29 |
| XXV | — | — | 28.58 | — | 22.86 | — | — | — | — | 5.71 | TDBA/0.72 |
| XXVI | — | — | 28.58 | — | 22.86 | — | — | — | — | 5.71 | TDAB/1.43 |
| XXVII | — | — | 28.58 | — | 22.86 | — | — | — | — | 5.71 | MDAB/0.37 |
| XXVIII | — | — | 28.58 | — | 22.86 | — | — | — | — | 5.71 | MDAB/0.92 |
| XXIX | — | — | 28.58 | — | 22.86 | — | — | — | — | 5.71 | MDAB/1.85 |
| XXX | 21.42 | — | 7.14 | — | 22.86 | — | — | — | — | 5.71 | HVA 2/0.72 |
| XXXI | 14.28 | — | 14.28 | — | 22.86 | — | — | — | — | 5.71 | HVA 2/0.72 |
| XXXII | 7.14 | — | 21.42 | — | 22.86 | — | — | — | — | 5.71 | HVA 2/0.72 |
| XXXIII | — | 28.58 | — | — | 22.86 | — | — | — | — | 5.6 | — |
| XXXIV | — | 8 | 28.58 | — | 22.86 | — | — | 5.6 | — | — | — |
| XXXV | — | — | 28.58 | — | 22.86 | — | — | — | — | 5.6 | — |
| XXXVI | 27.15 | — | — | 1.43 | 22.86 | — | — | — | — | 5.6 | — |
| XXXVII | 25.72 | — | — | 2.86 | 22.86 | — | — | — | — | 5.6 | — |
| XXXVIII | 22.86 | — | — | 5.72 | 22.86 | — | — | — | — | 5.6 | — |
| XXXIX | — | — | 28.58 | — | — | 22.86 | — | — | — | 5.6 | — |
| XXXIX | — | — | 28.58 | — | — | — | 22.86 | — | — | 5.6 | — |
| XXXX | — | — | 28.58 | — | 22.86 | — | — | — | 5.6 | — | — |
| XXXXI | — | — | 28.58 | — | 22.86 | — | — | — | — | 8.4 | — |
| XXXXII | — | — | 28.58 | — | 22.86 | — | — | — | — | 11.2 | — |
| XXXX-III | — | — | 28.58 | — | 22.86 | — | — | — | — | 11.2 | — |
| XXXXIV | — | — | 28.58 | — | 22.86 | — | — | — | — | 5.6 | — |
| XXXXV | — | — | 28.58 | — | 22.86 | — | — | — | — | 5.6 | — |
| XXXXVI | | | | | | | | | | | |

Production of the composites

Test specimens (100×100×4 mm) were produced from the polyesters investigated by the injection molding process at a barrel temperature of 250° C. A sheet was subsequently laid in a mold made of V2A steel (100×100×8 mm) and covered on one side with a 20 mm wide piece of PTFE film. The total area was covered with the rubber mixture to be tested. The sheet thus prepared was pressed in a hydraulic press (Schwabenthan -Polystat 200T) for 20 minutes at 180° C. and 200 bar.

Testing of adhesion in the composite

The testing of the adhesion in the composite between polyester material and vulcanized rubber was carried out by means of a peeling test following DIN 53 531. The rubber part, which was kept separate from the polyester material during vulcanization by means of the Teflon film, was here fixed in such a way that in the peeling tests the rubber strip was pulled off perpendicular to the thermoplastic surface. The results are shown in Table 2, with the assessment having been carried out as follows:

H Adhesion (fracture in rubber, i.e. cohesive fracture; high separation force)

- Non-adhesion (fracture in the interface between rubber and polyester, i.e. adhesive fracture; low to very low separation force)

t partial adhesion (border zone between cohesive and adhesive fracture; intermediate separation force)

TABLE 2

| | | Testing of the adhesion in the composite | | | | | | | | | | | |
|---|---|---|---|---|---|---|---|---|---|---|---|---|---|
| | Rubber | Molding composition | | | | | | | | | | | |
| Example | mixture | A | B | C | D | E | F | A1 | A2 | A3 | C1 | D1 | E1 | F1 |
| 1 | I | — | — | — | — | — | — | — | t | H | H | H | *) | *) |
| 2 | II | — | — | — | — | — | — | *) | *) | *) | *) | *) | *) | *) |
| 3 | III | — | — | — | — | — | — | *) | *) | *) | *) | *) | *) | *) |
| 4 | IV | H | H | H | H | H | H | *) | *) | *) | *) | *) | *) | *) |
| 5 | V | H | H | H | H | H | H | *) | *) | *) | *) | *) | *) | *) |
| 6 | VI | H | H | H | H | H | H | *) | *) | *) | *) | *) | *) | *) |
| 7 | VII | H | H | H | H | H | H | *) | *) | *) | *) | *) | *) | *) |
| 8 | VIII | H | H | H | H | H | H | *) | *) | *) | *) | *) | *) | *) |
| 9 | VIX | H | H | H | H | H | H | *) | *) | *) | *) | *) | *) | *) |
| 10 | X | H | H | H | H | H | H | *) | *) | *) | *) | *) | *) | *) |
| 11 | XI | H | H | H | H | H | H | *) | *) | *) | *) | *) | *) | *) |
| 12 | XII | H | H | H | H | H | H | *) | *) | *) | *) | *) | *) | *) |
| 13 | XIII | H | H | H | H | H | t | *) | *) | *) | *) | *) | *) | *) |
| 14 | XIV | H | H | H | H | H | H | *) | *) | *) | *) | *) | *) | *) |
| 15 | XV | H | H | H | H | H | H | *) | *) | *) | *) | *) | *) | *) |
| 16 | XVI | H | H | H | H | H | H | *) | *) | *) | *) | *) | *) | *) |
| 17 | XVII | H | H | H | H | H | H | *) | *) | *) | *) | *) | *) | *) |
| 18 | XVIII | H | H | H | H | H | H | *) | *) | *) | *) | *) | *) | *) |
| 19 | XIX | t | H | H | H | H | t | *) | *) | *) | *) | *) | *) | *) |
| 20 | XX | t | H | H | H | H | t | *) | *) | *) | *) | *) | *) | *) |
| 21 | XXI | H | H | H | H | H | H | *) | *) | *) | *) | *) | *) | *) |
| 22 | XII | H | H | H | H | H | H | *) | *) | *) | *) | *) | *) | *) |
| 23 | XIII | H | H | H | H | H | H | *) | *) | *) | *) | *) | *) | *) |
| 24 | XXIV | t | t | t | t | H | H | *) | *) | *) | *) | *) | *) | *) |
| 25 | XXV | H | H | H | H | H | t | *) | *) | *) | *) | *) | *) | *) |
| 26 | XXVI | H | H | H | H | H | H | *) | *) | *) | *) | *) | *) | *) |
| 27 | XXVII | H | H | H | H | H | H | *) | *) | *) | *) | *) | *) | *) |
| 28 | XXVIII | H | H | H | H | H | H | *) | *) | *) | *) | *) | *) | *) |
| 29 | XXIX | H | H | H | H | H | H | *) | *) | *) | *) | *) | *) | *) |
| 30 | XXX | — | — | — | t | t | — | *) | *) | *) | *) | *) | *) | *) |
| 31 | XXXI | t | t | t | H | H | H | *) | *) | *) | *) | *) | *) | *) |
| 32 | XXXII | H | H | H | H | H | H | *) | *) | *) | *) | *) | *) | *) |
| 33 | XXXIII | — | — | — | — | — | — | H | H | H | H | H | H | H |
| 34 | XXXIV | — | — | — | — | — | — | H | H | H | H | H | H | H |
| 35 | XXXV | — | — | — | — | — | — | H | H | H | H | H | H | H |
| 36 | XXXVI | — | — | — | — | — | — | t | H | H | H | H | H | H |
| 37 | XXXVII | — | — | — | — | — | — | H | H | H | H | H | H | H |
| 38 | XXXIII | — | — | — | — | — | — | H | H | H | H | H | H | H |
| 39 | XXXIX | — | — | — | — | — | — | H | H | H | H | H | H | H |
| 40 | XXXX | — | — | — | — | — | — | H | H | H | H | H | H | H |
| 41 | XXXXI | — | — | — | — | — | — | H | H | H | H | H | H | H |
| 42 | XXXXII | — | — | — | — | — | — | H | H | H | H | H | H | H |
| 43 | XXXXIII | — | — | — | — | — | — | H | H | H | H | H | H | H |
| 44 | XXXIV | — | — | — | — | — | — | t | H | H | H | H | H | H |
| 45 | XXXXV | — | — | — | — | — | — | H | H | H | H | H | H | H |
| 46 | XXXXVI | — | — | — | — | — | — | H | H | H | H | H | H | H |

*) not determined

Example 1 shows that the use of non-functionalized rubber without bismaleimide does not give a strong composite. Using this system as a basis and adding an appreciable amount of bismaleimide to the rubber mixture likewise does not give a strong composite, as shown by Example 3. Use on the other hand of a functionalized rubber, but omitting the addition of a bismaleimide as in Example 2, likewise does not result in strong adhesion in the composite.

While in Examples 4 to 32 the bismaleimide is incorporated in the rubber composition, in Examples 33 to 46 it is added to the thermoplastic. It can be seen that equally good results are obtained in both embodiments. As shown by Example 1, in this case even a non-functionalized rubber can be successfully used.

Obviously, numerous modifications and variations of the present invention are possible in light of the above teachings. It is therefore to be understood that within the scope of the appended claims, the invention may be practiced otherwise than as specifically described herein.

This application is based on German patent application P 44 15 302.3, filed in the German Patent Office on Apr. 30, 1994, the entire contents of which are hereby incorporated by reference.

What is claimed as new and desired to be secured by Letters Patent of the United States is:

1. A process for producing a composite article comprising:

i) a thermoplastic polyester hard component; and ii) a vulcanized soft component, comprising the step of vulcanizing a soft component while in contact with a thermoplastic polyester hard component under conventional vulcanization conditions, wherein said soft component comprises:

I. 100 parts by weight of a rubber;

II. 0 to 300 parts by weight of a filler;

III. 1 to 10 parts by weight of a peroxidic vulcanization agent;

IV. 0 to 4 parts by weight of a vulcanization activator; and

V. 0 to 150 parts by weight of a plasticizer, wherein a) either said hard component, said said soft component or both, further comprises from 0.5 to 12 parts by weight of a difunctional or polyfunctional maleimide of the formula

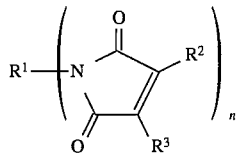

where $R^1$ is a divalent or higher-valent radical or a direct bond, while $R^2$ and $R^3$ are each, independently hydrogen, $C_{1-20}$ alkyl, $C_{3-20}$ cycloalkyl or $C_{6-20}$ aryl; n is an integer greater than or equal to 2, and b) wherein when said hard component contains no difunctional or polyfunctional maleimide, said rubber possesses carboxyl or acid anhydride groups.

2. The process of claim 1, wherein said hard component is selected from the group consisting of a polyester, a polyester molding composition, a polyester blend or a fiber composite material having a polyester matrix.

3. The process of claim 1, wherein a dicarboxylic acid component of said thermoplastic polyester is based on terephthalic acid.

4. The process of claim 1, wherein said thermoplastic polyester contains aliphatic double bonds.

5. The process of claim 3, wherein a diol component of said thermoplastic polyester comprises from 0 to 99.9 mol % of butane-1,4-diol and from 0.1 to 100 mol % of butene-1,4-diol.

6. The process of claim 3, wherein a diol component of said thermoplastic polyester comprises from 50 to 99 mol % of butane-1,4-diol and from 1 to 50 mol % of butene-1,4-diol.

7. The process of claim 1, wherein said rubber possesing carboxyl or anhydride groups is prepared in situ during vulcanization from a non-functionalized rubber and a compound which contains at least one C—C double bond and/or C—C triple bond and at least one carboxyl or anhydride group.

8. The process of claim 1, wherein said rubber is selected from the group consisting of an EP(D)M rubber, E-SBR, S-SBR, BR, NRI IR, IIR, CIIR, BIIR, NBR, CR, a styrene-containing block copolymer and/or a polyalkenylene.

9. The process of claim 1, wherein said rubber comprises from 30 to 100 parts by weight of an EP(D)M rubber and from 70 to 0 parts by weight of other rubbers.

10. The process of claim 1, wherein said difunctional or polyfunctional maleimide used is a bismaleimide containing an aromatic radical $R^1$.

11. The process of claim 1, wherein said difunctional or polyfunctional maleimide is used in an amount from 1 to 8 parts by weight.

12. The process of claim 1, wherein said difunctional or polyfunctional maleimide is used in an amount from 1.25 to 6 parts by weight.

13. The process of claim 1, wherien said rubber composition further comprises an element selected from the group consisting of vulcanization retarders, aging inhibitors, processing aids, mold release agents and/or blowing agents.

14. The process of claim 1, wherein said composite is produced in a single-stage or in a two-stage process in which the composition temperature of the rubber mixture in the barrel is in the range between 40° and 80° C. and the vulcanization temperature is in the range between 140° and 200° C.

15. The process of claim 1, wherein is an integer of from 2 to 4.

16. A composite article produced by the process of claim 1.

* * * * *